United States Patent [19]
Shimizu et al.

[11] Patent Number: 5,301,501
[45] Date of Patent: Apr. 12, 1994

[54] DEVICE FOR DETERMINING DETERIORATION OF A CATALYTIC CONVERTER FOR AN ENGINE

[75] Inventors: Yasuhiro Shimizu; Nobuyuki Kobayashi, both of Toyota, Japan

[73] Assignee: Toyota Jidosha Kabushiki Kaisha, Aichi, Japan

[21] Appl. No.: 956,987

[22] Filed: Oct. 6, 1992

[30] Foreign Application Priority Data

Oct. 11, 1991 [JP] Japan .................................. 3-263892

[51] Int. Cl.⁵ .................................................. F01N 3/20
[52] U.S. Cl. .................................... 60/274; 60/276; 60/277
[58] Field of Search ......................... 60/274, 276, 277

[56] References Cited

U.S. PATENT DOCUMENTS

| Re. 33,942 | 6/1992 | Katsuno et al. |
|---|---|---|
| 4,177,787 | 12/1979 | Hattori et al. ........................ 60/277 |
| 4,739,614 | 4/1988 | Katsuno et al. |
| 4,817,383 | 4/1989 | Masui ................................. 60/274 |
| 5,088,281 | 2/1992 | Izutani et al. |
| 5,119,628 | 6/1992 | Uema et al. ......................... 60/274 |

FOREIGN PATENT DOCUMENTS

| 60-231155 | 11/1985 | Japan . |
|---|---|---|
| 61-185634 | 8/1986 | Japan . |
| 62-29711 | 2/1987 | Japan . |
| 63-97852 | 4/1988 | Japan . |
| 63-147941 | 6/1988 | Japan . |
| 2-30915 | 2/1990 | Japan . |
| 2-33408 | 2/1990 | Japan . |
| 2-91440 | 3/1990 | Japan . |
| 2-207159 | 8/1990 | Japan . |
| 3-57862 | 3/1991 | Japan . |
| 3-134241 | 6/1991 | Japan . |
| 3-286160 | 12/1991 | Japan . |

OTHER PUBLICATIONS

John W. Koupal et al., "Detection of Catalyst Failure On-Vehicle Using the Dual Oxygen Sensor Method," Jul. 31, 1991, pp. 135–146 (SAE Technical Paper Series 910561).

William B. Clemmens, et al., "Detection of Catalyst Performance Loss Using On-Board Diagnostics," Feb. 26–Mar. 2, 1990, pp. 1–18; International Congress and Exposition—Detroit, Mich. (SAE Technical Paper Series 900062).

Primary Examiner—Douglas Hart
Attorney, Agent, or Firm—Oliff & Berridge

[57] ABSTRACT

A device for determining a deterioration of a catalytic converter for an engine equipped with a catalytic converter disposed in the exhaust passage and upstream and downstream air-fuel ratio sensors disposed in the exhaust passage upstream and downstream of the catalytic converter, respectively, wherein the device calculates the lengths of the output response curves of the upstream and downstream air-fuel ratio sensors LVOM and LVOS, respectively when the engine air-fuel ratio is feedback controlled, then the device determines whether or not the catalyst is deteriorated in accordance with the magnitude of the ratio LVOS/LVOM.

10 Claims, 12 Drawing Sheets

DEVICE FOR DETERMINING DETERIORATION OF A CATALYTIC CONVERTER FOR AN ENGINE

BACKGROUND OF THE INVENTION

1. Field of the Invention

The present invention relates to an air-fuel ratio control device for an engine which controls an air-fuel ratio of the engine based on at least an output of an air-fuel ratio sensor disposed in the exhaust passage upstream of a three-way catalyst. More specifically, the present invention relates to an air-fuel ratio control device that is able to detect deterioration of the three-way catalyst based on at least an output of an air-fuel ratio sensor disposed in the exhaust passage downstream of the three-way catalyst.

2. Description of the Related Art

An air-fuel ratio control device for controlling an air-fuel ratio of an engine by feedback control based on an output of an air-fuel ratio sensor ($O_2$ sensor) disposed in an exhaust passage upstream of a catalytic converter is known as a single $O_2$ sensor system. The single $O_2$ sensor system is used for controlling the air-fuel ratio of the engine to a stoichiometric air-fuel ratio to improve the condition of the exhaust emissions by utilizing the ability of the three-way catalytic converter to a maximum degree.

To compensate for individual differences among cylinders or changes due to aging of the upstream $O_2$ sensor, a double $O_2$ sensor system using two $O_2$ sensors has been developed (U.S. Pat. No. 4,739,614). In the double $O_2$ sensor system, $O_2$ sensors are disposed upstream and downstream of the catalytic converter in the exhaust passage, and the air-fuel ratio control is carried out based on the output of the downstream $O_2$ sensor as well as the output of the upstream $O_2$ sensor.

Nevertheless, even in the double $O_2$ sensor system, if the catalyst in the catalytic converter is deteriorated, the condition of the exhaust emissions, such as HC, CO, and NOx, is worsened, therefore it is necessary to detect the deterioration of the catalyst accurately.

To detect the deterioration of the catalyst in the catalytic converter, various methods or devices have been proposed.

For example, in U.S. Pat. No. 4,739,614, a method for detecting the deterioration based on the interval of reversals of the output of the downstream $O_2$ sensor during air-fuel ratio feedback control (i.e., the period of the changes of the output signal from a rich side air-fuel ratio to a lean side air-fuel or viceversa) is disclosed.

When the catalyst has deteriorated, the interval of reversals of the output of the downstream $O_2$ sensor during the air-fuel ratio feedback control becomes shorter and the amplitude of the output of the downstream $O_2$ sensor becomes larger. The method disclosed in U.S. Pat. No. 4,739,614, utilizes this phenomena to detect the deterioration of the catalyst and determines that the catalyst has deteriorated when the ratio of the period $T_1$ of the reversal of the output of the upstream $O_2$ sensor to the period $T_2$ of the reversal of the output of the downstream $O_2$ sensor, i.e., $T_1/T_2$, becomes larger than a predetermined value (or, alternatively, when the amplitude of the output of the downstream $O_2$ sensor becomes larger than a predetermined value). However, in the above system, if the center value of the air-fuel ratio controlled by the air-fuel ratio feedback control deviates largely from the stoichiometric air-fuel ratio, reversal of the output of the downstream $O_2$ sensor does not occur. In this case, the output of the downstream $O_2$ sensor oscillates at a small amplitude at a rich side or lean side of the air-fuel ratio.

Also, in some cases, the amplitude of the output of the downstream $O_2$ sensor may become large even if the catalyst is not deteriorated (e.g., when the operating condition of the engine changes suddenly, the amplitude of the output of the downstream $O_2$ sensor becomes large momentarily).

Therefore, it is sometimes difficult to detect the deterioration of the catalyst accurately based on the period of reversal or the amplitudes of the output of the $O_2$ sensors.

SUMMARY OF THE INVENTION

In view of the problems of the related art, the object of the present invention is to provide a device for determining a deterioration of a catalytic converter which can detect the deterioration of the catalytic converter used in the double $O_2$ sensor system accurately even if the central value of the air-fuel ratio feedback control deviates largely from the stoichiometric air-fuel ratio.

According to the present invention, there is provided a device for determining deterioration of a three-way catalyst disposed in an exhaust passage of an internal combustion engine equipped with an upstream air-fuel ratio sensor disposed in the exhaust passage upstream of the three-way catalyst, a downstream air-fuel ratio sensor disposed in the exhaust passage downstream of the three way catalyst, and a feedback control means for controlling the air-fuel ratio of the engine by feedback control based on at least the output of the upstream air-fuel ratio sensor.

The device comprises a means for calculating the length of the response curve of the output signal of the downstream air-fuel ratio sensor when the air-fuel ratio of the engine is controlled by the feedback control means, and a means for determining whether or not the catalyst has deteriorated in accordance with, at least, the calculated length of the response curve of the output signal of the downstream air-fuel ratio sensor.

BRIEF DESCRIPTION OF THE DRAWINGS

The present invention will be better understood from the description as set forth hereinafter, with reference to the accompanying drawings, in which.

DESCRIPTION OF THE PREFERRED EMBODIMENTS

The principle of the method for detecting deterioration of a three-way catalyst according to the present invention will be explained referring to FIGS. 1A to 1D.

As explained later in detail, the deterioration of the catalyst is detected based on the length of the output response curve of the downstream $O_2$ sensor.

Figure 1A:
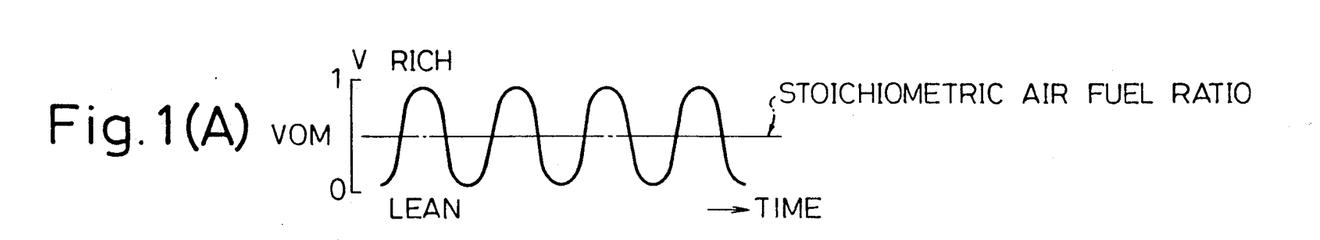
FIGS. 1A to 1G explain typical changes in the output response of the downstream $O_2$ sensor caused by the deterioration of the catalyst.

FIG. 1A shows the response curve of the output signal (VOM) of the upstream $O_2$ sensor when the air-fuel ratio of the engine is feedback controlled. As seen from FIG. 1B, the output VOM of the upstream $O_2$ sensor oscillates around the central value (mean value) regularly. When the air-fuel ratio of the engine is feedback controlled by the upstream $O_2$ sensor, the central value of the oscillation coincides with a stoichiometric air-fuel ratio signal line.

FIGS. 1B through 1G show the change of the response curve of the output VOS of the downstream $O_2$ sensor caused by the deterioration of the catalyst.

Figure 1B:
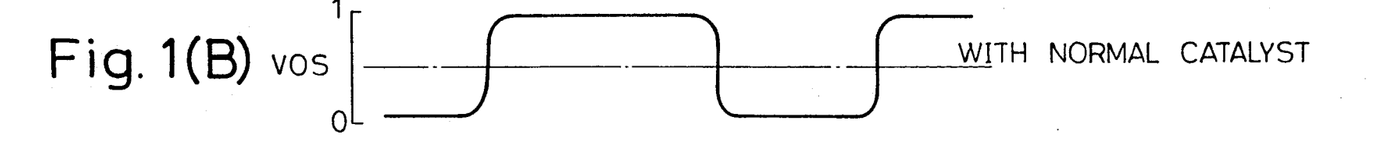
Figure 1C:
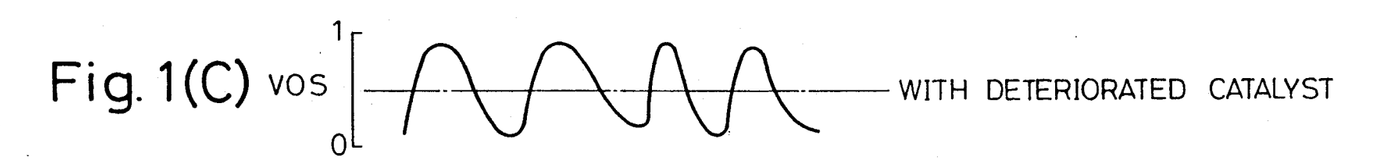

FIGS. 1B and 1C show the response of the output under normal catalyst conditions and under deteriorated catalyst conditions, respectively. In the case of FIGS. 1B and 1C, the central value of the air-fuel ratio feedback control is maintained at the stoichiometric air-fuel ratio. FIGS. 1D through 1G show the response of the output VOS when the central value of the air-fuel ratio feedback control largely deviates from the stoichiometric air-fuel ratio.

Figure 1D:
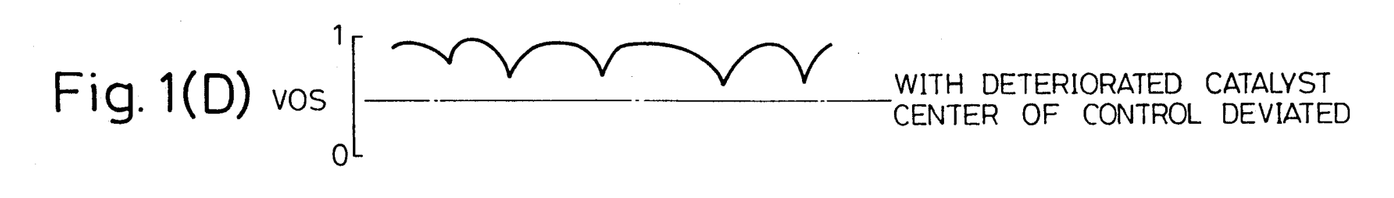
Figure 1E:
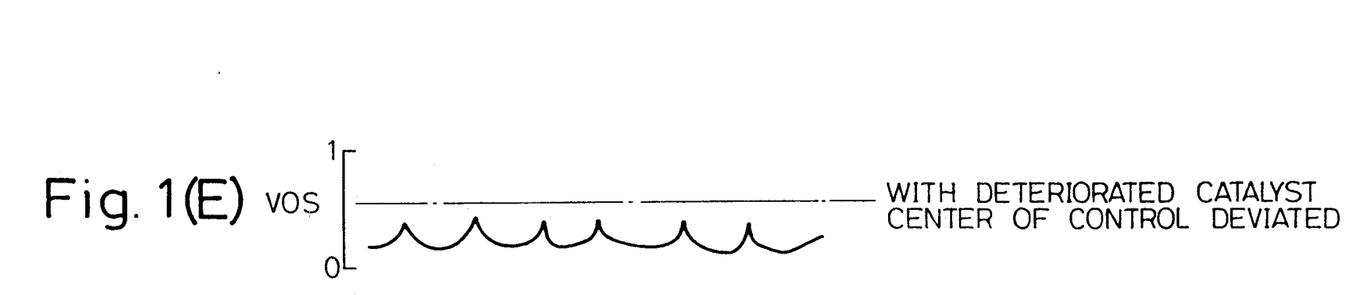
Figure 1F:
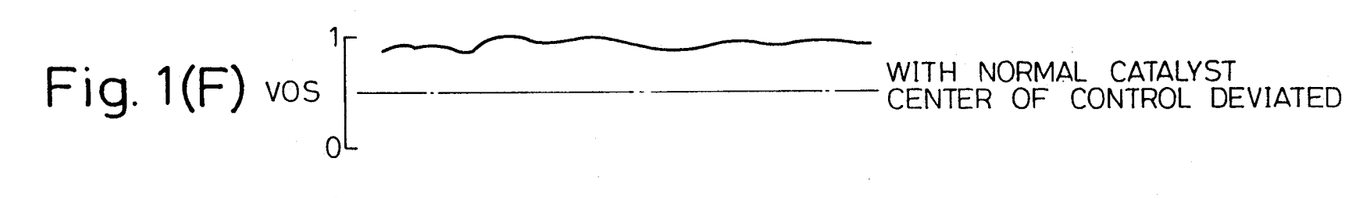
Figure 1G:
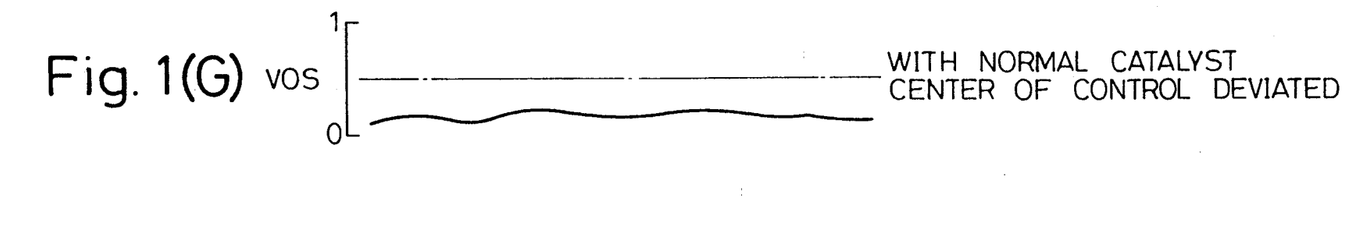

This can occur, for example, when the output characteristics of the upstream $O_2$ sensor are changed or when the upstream $O_2$ sensor is affected strongly by the change of the characteristics of the fuel injector of a certain cylinder. In these cases, the central value of the actual air-fuel ratio control largely deviates from the stoichiometric air-fuel ratio (as shown in FIGS. 1D through 1G). FIGS. 1D and 1E show the response of the output VOS of the downstream $O_2$ sensor when the catalyst has deteriorated in such cases. Note that, in these cases, the output VOS does not intersect the stoichiometric air-fuel ratio line, and no reversal of the output VOS occurs even if the catalyst has deteriorated. Accordingly, the deterioration of the catalyst cannot be determined from the interval of the reversal of the output VOS.

However, even in these cases, if the catalyst has deteriorated, the length of the response curve of the output VOS increases (FIGS. 1C, 1D, 1E) compared with the case where the catalyst is normal (FIGS. 1B, 1F, 1G) regardless of the deviation of the central value of the feedback control. Therefore, the deterioration of the catalyst can be determined accurately using the length of the response curve of the output VOS even if the central value of the feedback control has deviated largely from the stoichiometric air-fuel ratio.

Figure 2:
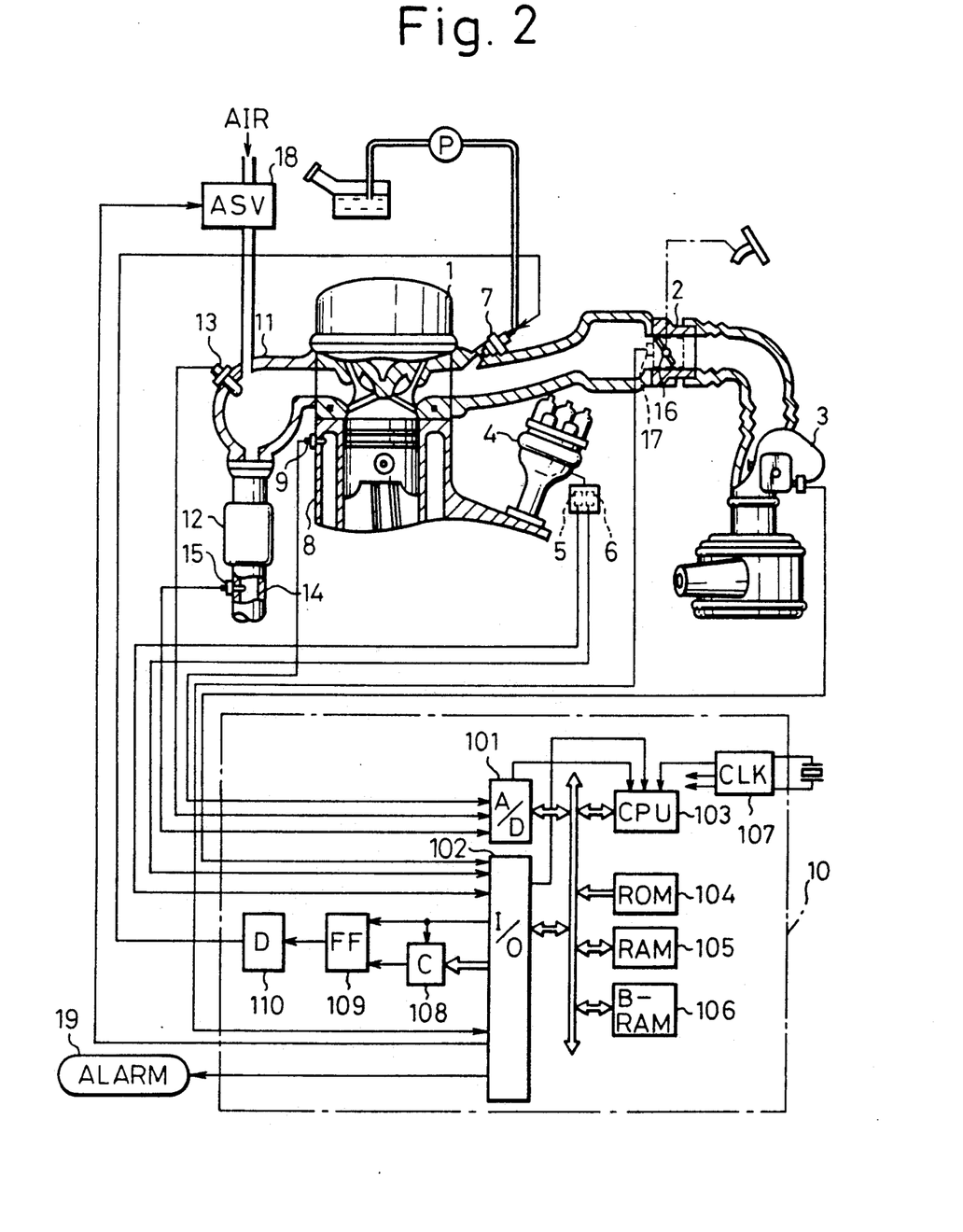
FIG. 2 is a schematic view of an internal combustion engine showing an embodiment of the present invention.

FIG. 2 schematically illustrates an embodiment of the device for determining the deterioration of the catalyst for carrying out the method of determination explained above.

In FIG. 2, reference numeral 1 represents an internal combustion engine for an automobile. An air-intake passage 2 of the engine 1 is provided with a potentiometer-type airflow meter 3 for detecting an amount of air drawn into the engine 1 and generates an analog voltage signal proportional to the amount of air flowing therethrough. The signal from the air-flow meter 3 is transmitted to a multiplexer-incorporating analog-to-digital (A/D) converter 101 of the control circuit 10.

Crank angle sensors 5 and 6, for detecting the angle of the crankshaft (not shown) of the engine 1, are disposed at a distributor 4.

In this embodiment, the crank angle sensor 5 generates a pulse signal at every 720° C. crank angle (CA) and the crank angle sensor 6 generates a pulse signal at every 30° CA. The pulse signals from the crank angle sensors 5 and 6 are supplied to an input/output (I/O) interface 102 of the control circuit 10. Further, the pulse signal of the crank angle sensor 6 is then supplied to an interruption terminal of a central processing unit (CPU) 103.

In the air intake passage 2, a fuel injection valve 7 is provided at an inlet port of each cylinder of the engine 1, for supplying pressurized fuel from the fuel system to the cylinders of the engine.

A coolant temperature sensor 9 for detecting the temperature of the coolant is disposed in a water jacket of a cylinder block 8 of the engine 1. The coolant temperature sensor 9 generates an analog voltage signal in response to the temperature THW of the coolant and transmits this signal to the A/D converter 101 of the control circuit 10.

In the exhaust system, a three-way reducing and oxidizing catalytic converter 12 is disposed in the exhaust passage downstream of the exhaust manifold 11. The catalytic converter 12 is able to remove three pollutants in the exhaust gas, i.e., CO, HC, and $NO_x$, simultaneously.

An upstream $O_2$ sensor 13 is provided at the exhaust manifold 11, i.e., upstream of the catalytic converter 12.

A downstream $O_2$ sensor 15 is disposed at an exhaust pipe 14 downstream of the catalytic converter 12.

The upstream $O_2$ sensor 13 and the downstream $O_2$ sensor 15 generate output signals corresponding to the concentration of the oxygen component in the exhaust gas.

More specifically, the $O_2$ sensors 13 and 15 generate output voltage signals which are changed in accordance with whether the air-fuel ratio of the exhaust gas is rich or lean, compared with the stoichiometric air-fuel ratio. The signals output by the $O_2$ sensors 13 and 15 are transmitted to the A/D converter 101 of the control circuit 10.

The control circuit 10, which may be constructed by a microcomputer, further comprises a central processing unit (CPU) 103, a read-only-memory (ROM) 104 for storing a main routine and interrupt routines such as a fuel injection routine, an ignition timing routine and constants, etc., a random-access-memory 105 (RAM) for storing temporary data, a backup RAM 106, and a clock generator 107 for generating various clock signals. The backup RAM 106 is directly connected to a battery (not shown), and therefore the content of the backup RAM 106 is preserved even when the ignition switch (not shown) is turned off.

A throttle valve 16 operated by a vehicle driver is provided in the intake air passage 2 together with an idle switch 17 for detecting the opening of the throttle valve and generating a signal ("LL signal") when the throttle valve 16 is fully closed. This LL signal is supplied to the I/O interface 102 of the control circuit 10.

Reference numeral 18 designates a secondary air supply valve for introducing secondary air to the exhaust manifold 11 to thereby reduce the emission of HC and CO during a deceleration or idling operation of the engine.

Reference numeral 19 designates an alarm which is activated when it is determined that the catalytic converter 12 has deteriorated.

A down counter 108, a flip-flop 109, and a drive circuit 110 are provided in the control circuit 10 for controlling the fuel injection valve 7.

When a fuel injection amount TAU is calculated in a routine, as explained later, the amount TAU is preset in the down counter 108, and simultaneously, the flip-flop 109 is set, and, as a result, the drive circuit 110 initiates the activation of the fuel injection valve 7. On the other hand, the down counter 108 counts up the clock signal from the clock generator 107, and, finally, a logic "1" signal is generated from the terminal of the down counter 108 to reset the flip-flop 109, so that the drive circuit 110 stops the activation of the fuel injection valve 7, whereby an amount of fuel corresponding to the fuel injection amount TAU is supplied to the cylinders.

Interruptions occur at the CPU 103 when the A/D converter 101 completes an A/D conversion and generates an interrupt signal; when the crankangle sensor 6 generates a pulse signal; and when the clock generator 107 generates a special clock signal.

The intake air amount data Q from the air flow meter 3 and the coolant temperature data THW from the coolant sensor 9 are fetched by an A/D conversion routine(s) executed at predetermined intervals and then are stored in the RAM 105; i.e., the data Q and THW in RAM 105 are renewed at predetermined intervals. The engine speed $N_e$ is calculated by an interrupt routine executed at 30° CA, i.e., at every pulse signal of the crank angle sensor 6, and is stored in the RAM 105.

The operation of the control circuit 10 of FIG. 2 is now explained.

Figure 3A:
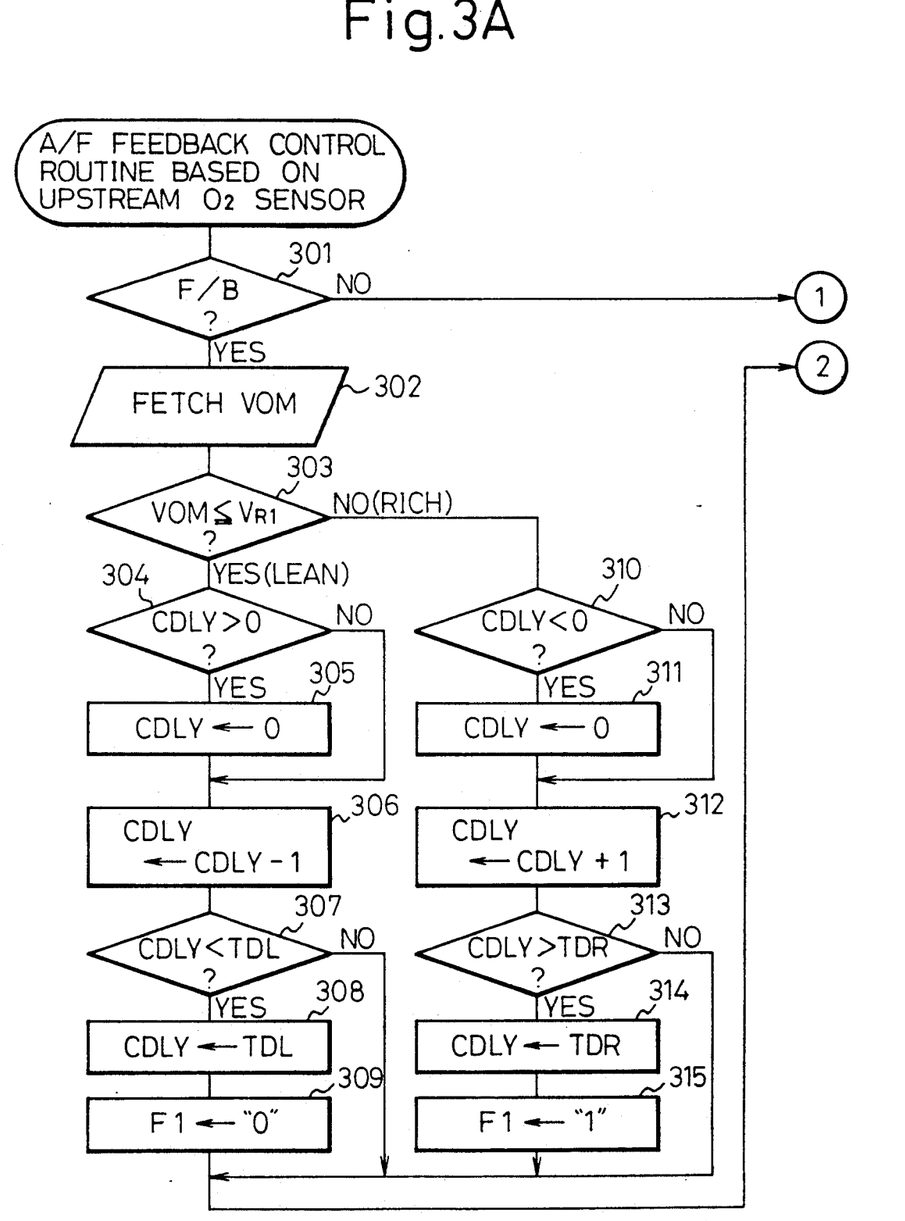
FIGS. 3A, 3B, 5A, 5B, 6, and 7A through 7C are flow charts showing the operations of the control circuit in FIG. 2.
Figure 3B:
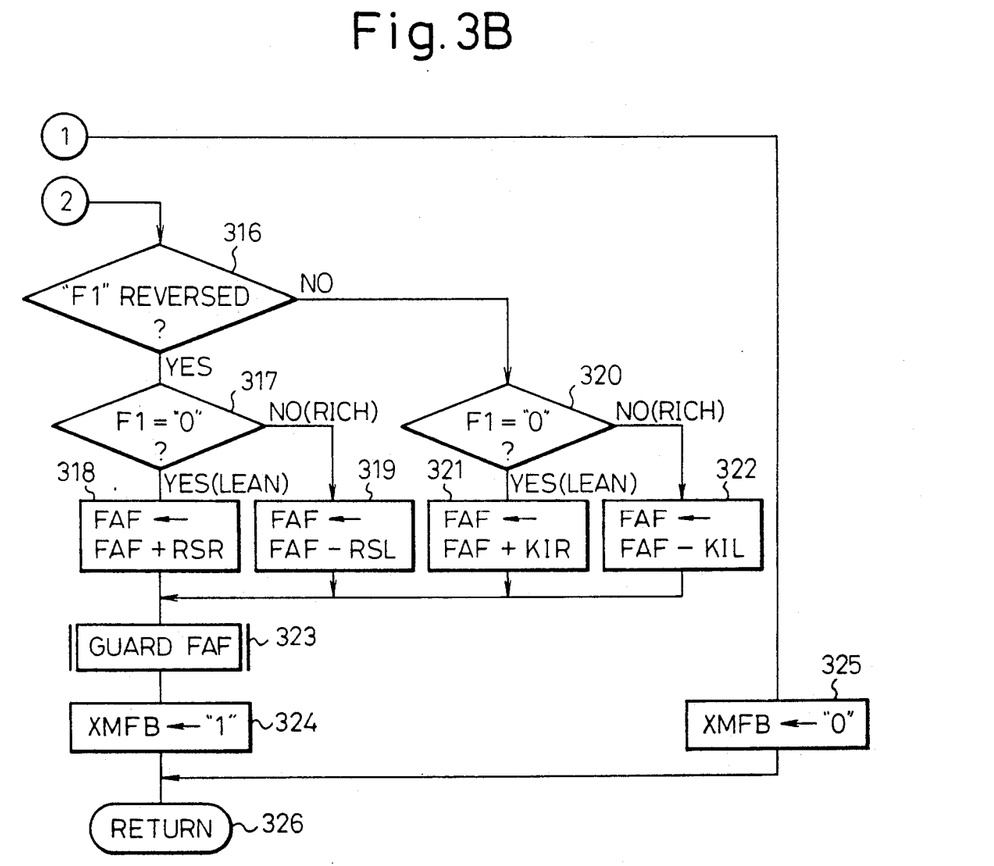

FIGS. 3A and 3B show a routine for feedback control of the air-fuel ratio. This routine calculates an air-fuel ratio correction factor FAF in accordance with the output VOM of the upstream $O_2$ sensor 13 and is executed at predetermined intervals of, e.g., 4 ms.

At step 301 in FIG. 3A, it is determined whether or not all conditions for air-fuel ratio feedback control are satisfied. The conditions for feedback control are, for example:

1) the engine is not being started,
2) the coolant temperature is higher than a predetermined value,
3) fuel increments, such as a start-up fuel increment, a warming-up fuel increment, a power fuel increment, or an OTP fuel increment for preventing an excess rise in the temperature of the catalytic converters, are not being carried out,
4) the output of the upstream $O_2$ sensor 13 has been reversed (i.e., changed from a rich air-fuel ratio output signal to a lean air-fuel ratio output signal or vice versa) at least once,
5) a fuel cut operation is not being carried out.

If any one of these conditions is not satisfied, the routine proceeds to step 325 in FIG. 3B, where the air-fuel ratio feedback control flag XMFB to set to "0", then the routine ends at step 326.

If all of the conditions for air-fuel ratio feedback control are satisfied at step 301, the routine proceeds to step 302.

At step 302, A/D conversion is performed upon the output voltage VOM of the upstream $O_2$ sensor 13. The A/D converted value is then fetched from the A/D converter 101. Then, at step 303, the voltage VOM is compared with a reference voltage $V_{R1}$ to determine whether the current air-fuel ratio detected by the upstream $O_2$ sensor 13 is on the rich side or on the lean side with respect to the stoichiometric air-fuel ratio. The reference voltage $V_{R1}$ is usually set at or near the central value of the maximum amplitude of the output of the $O_2$ sensor. In this embodiment, $V_{R1}$ is set to 0.45 V.

If $VOM \leq V_{R1}$, which means that the current air-fuel ratio is lean, the control proceeds to step 304, where it is determined whether or not the value of a delay counter CDLY is positive. If CDLY > 0, the control proceeds to step 305, where the delay counter CDLY is cleared, and then the routine proceeds to step 306. If CDLY ≤ 0, the control proceeds directly to step 306. At step 306, the delay counter CDLY is counted down by 1, and at step 307, it is determined whether or not CDLY < TDL. Note that TDL is a lean delay time for which a rich state is maintained even after the output of the upstream $O_2$ sensor 13 is changed from the rich side to the lean side and is defined by a negative value. Therefore, at step 307, only when CDLY < TDL does the control proceed to step 308, where CDLY is made TDL, and then to step 309, where an air-fuel ratio flag F1 is made "0" (lean state). On the other hand, if $VOM > V_{R1}$, which means that the current air-fuel ratio is rich, the control proceeds to step 310, where it is determined whether or not the value of the delay counter CDLY is negative. If CDLY < 0, the control proceeds to step 311, where the delay counter CDLY is cleared, and then proceeds to step 312. If CDLY ≥ 0, the control directly proceeds to 312. At step 312, the delay counter CDLY is counted up by 1 and at step 313, it is determined whether or not CDLY > TDR. Note that TDR is a rich delay time for which a lean state is maintained even after the output of the upstream $O_2$ sensor 13 is changed from the lean side to the rich side and is defined by a positive value. Therefore, at step 313, only when CDLY > TDR does the control proceed to step 314, where CDLY is made TDR, and then to step 315, where the air-fuel ratio flag F1 is made "1" (rich state).

Next, at step 316 in FIG. 3B, it is determined whether or not the air-fuel ratio flag F1 is reversed, i.e., whether or not the delayed air-fuel ratio detected by the upstream $O_2$ sensor 13 is reversed. If the air-fuel ratio flag F1 is reversed, the control proceeds to steps 317 to 319, where a skip operation is carried out. That is, if the flag F1 is "0" (lean) at step 317, the control proceeds to step 318, where the correction factor FAF is remarkably increased by a skip amount RSR. Also, if the flag F1 is "1" (rich) at step 317, the control proceeds to step 319, where the correction factor FAF is remarkably reduced by the skip amount RSL. On the other hand, if the air-fuel ratio flag F1 is not reversed at step 316, the control proceeds to steps 320 to 322, where an integration operation is curried out. That is, if the flag F1 is "0" (lean) at step 320, the control proceeds to step 321, where the correction factor FAF is gradually increased by a rich integration amount KIR. Also, if the flag F1 is "1" (rich) at step 320, the control proceeds to step 322, where the correction factor FAF is gradually reduced by a lean integration amount KIL.

Then, at step 323, the air-fuel ratio correction factor FAF is guarded, for example, by a minimum value of 0.8 and by a maximum value of 1.2, to thereby prevent the controlled air-fuel ratio from becoming too rich or too lean.

The correction factor FAF is then stored in the RAM 105 and the routine proceeds to step 324, where the air-fuel ratio feedback control flag XMFB is made "1", and then the routine terminates at step 326.

Figure 4A:
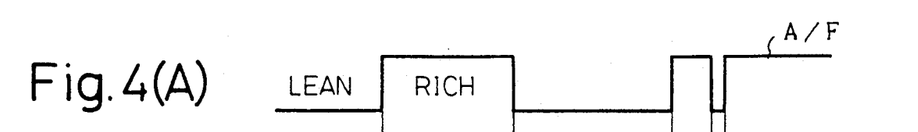
FIGS. 4A to 4D are timing diagrams explaining the flow chart of FIGS. 3A and 3B.
Figures 4B, 4C:
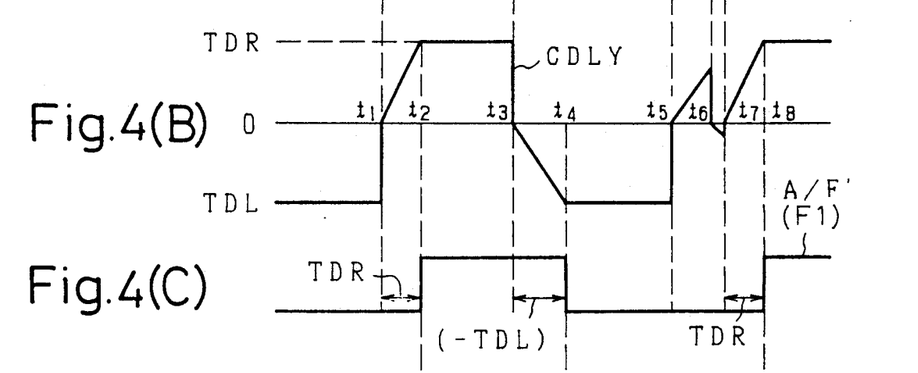
Figure 4D:
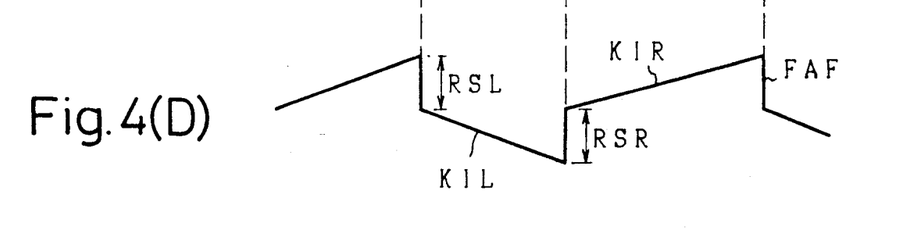

The control operation by the flow charts of FIGS. 3A and 3B are further explained with reference to FIGS. 4A to D. As illustrated in FIG. 4A, when the air-fuel ratio A/F is obtained by the output of the upstream $O_2$ sensor 13, the delay counter CDLY is counted up during a rich state, and is counted down during a lean state, as illustrated in FIG. 4B. As a result, a delayed air-fuel ratio corresponding to the air-fuel ratio flag F1 is obtained as illustrated in FIG. 4C. For example, at time $t_1$, even when the air-fuel ratio A/F is changed from the lean side to the rich side, the delayed air-fuel ratio F1 is changed at time $t_2$ after the rich delay time TDR. Similarly, at time $t_3$, even when the air-fuel ratio A/F is changed from the rich side to the lean side, the delayed air-fuel ratio A/F' (F1) is changed at time $t_4$ after the lean delay time TDL. At time $t_5$, $t_6$, or $t_7$, however, when the air-fuel ratio A/F is reversed in a shorter time than the rich delay time TDR or the lean delay time TDL, the delayed air fuel ratio F1 is reversed at time $t_8$. That is, the delayed air-fuel ratio A/F' (F1) is stable when compared with the air-fuel ratio A/F. Further, as illustrated in FIG. 5D, at every change of the delayed air-fuel ratio F1 from the rich side to the lean side, or vice versa, the correction factor FAF is skipped by the skip amount RSR or RSL, and the correction factor FAF is gradually increased or reduced in accordance with the delayed air-fuel ratio F1.

Next, the air-fuel ratio feedback control of the double $O_2$ sensor system in which the air-fuel ratio is controlled based on the output of the downstream $O_2$ sensor 15 as well as the output of the upstream $O_2$ sensor 13 is explained.

Generally, three types of air-fuel ratio feedback control operations by the downstream $O_2$ sensor 15 are used, i.e., the type in which one or more of the parameters such as the skip amounts RSR, RSL, integration amounts KIR, KIL and delay times TDR, TDL are variable, the type in which the reference voltage $V_{R1}$ of the outputs VOM of the upstream $O_2$ sensor is variable, and the type in which a second air-fuel ratio correction factor FAF2 calculated in accordance with the output of the downstream $O_2$ sensor 15 is introduced.

For example, if the rich skip amount RSR is increased or if the lean skip amount RSL is decreased, the controlled air-fuel ratio becomes richer, and if the lean skip amount RSL is increased or if the rich skip amount RSR is decreased, the controlled air-fuel ratio becomes leaner. Thus, the air-fuel ratio can be controlled by changing the rich skip amount RSR and the lean skip amount RSL in accordance with the output of the downstream $O_2$ sensor 15. Further, if the rich integration amount KIR is increased or if the lean integration amount KIL is decreased, the controlled air-fuel ratio becomes richer, and if the lean integration amount KIL is increased or if the rich integration amount KIL is decreased, the controlled air-fuel ratio becomes leaner. Thus, the air-fuel ratio can be controlled by changing the rich integration amount KIR and the lean integration amount KIL in accordance with the output of the downstream $O_2$ sensor 15. Further, if the reference voltage $O_2$ is increased, the controlled air-fuel ratio becomes richer, and if the reference voltage $V_{R1}$ is decreased, the controlled air-fuel ratio becomes leaner. Thus, the air-fuel ratio can be controlled by changing the reference voltage $V_{R1}$ in accordance with the output of the downstream $O_2$ sensor 15.

Also, if the rich delay time becomes longer than the lean delay time (TDR>TDL), the controlled air-fuel ratio becomes richer, and if the lean delay time becomes longer than the rich delay time (TDL>TDR), the controlled air-fuel ratio becomes leaner. Thus the air-fuel ratio can be controlled by changing the rich delay time period TDR and the lean delay time period TDL in accordance with the output of the downstream $O_2$ sensor 15.

These types of operations of the air-fuel ratio have respective advantages. For example, if the delay times TDR, TDL are variable, precise control of the air-fuel ratio can be obtained, and if the skip amounts RSR, RSL are variable, the response of the control is improved. Naturally, two or three of these types of operations can be used at the same time.

Figure 5A:
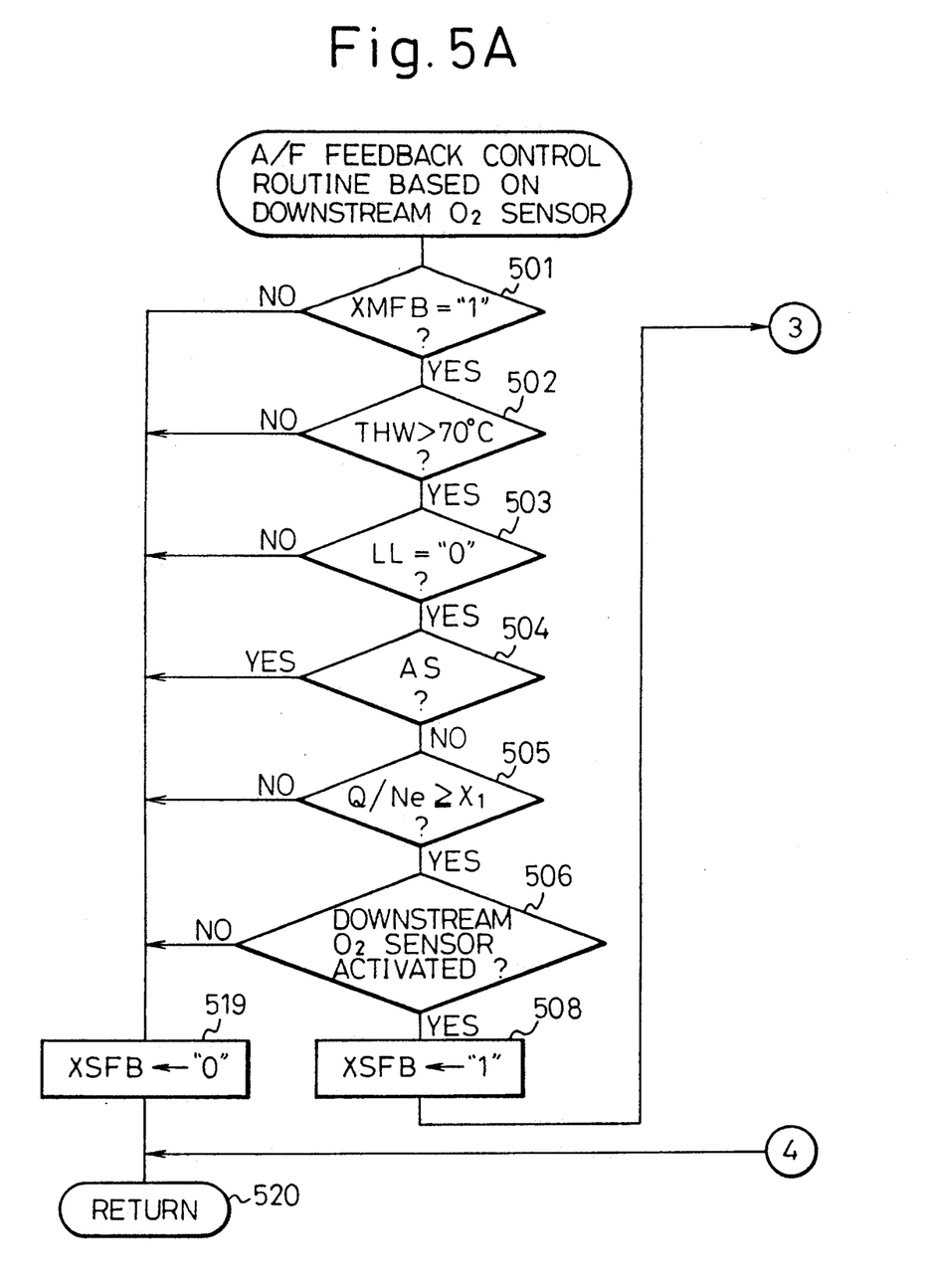
Figure 5B:
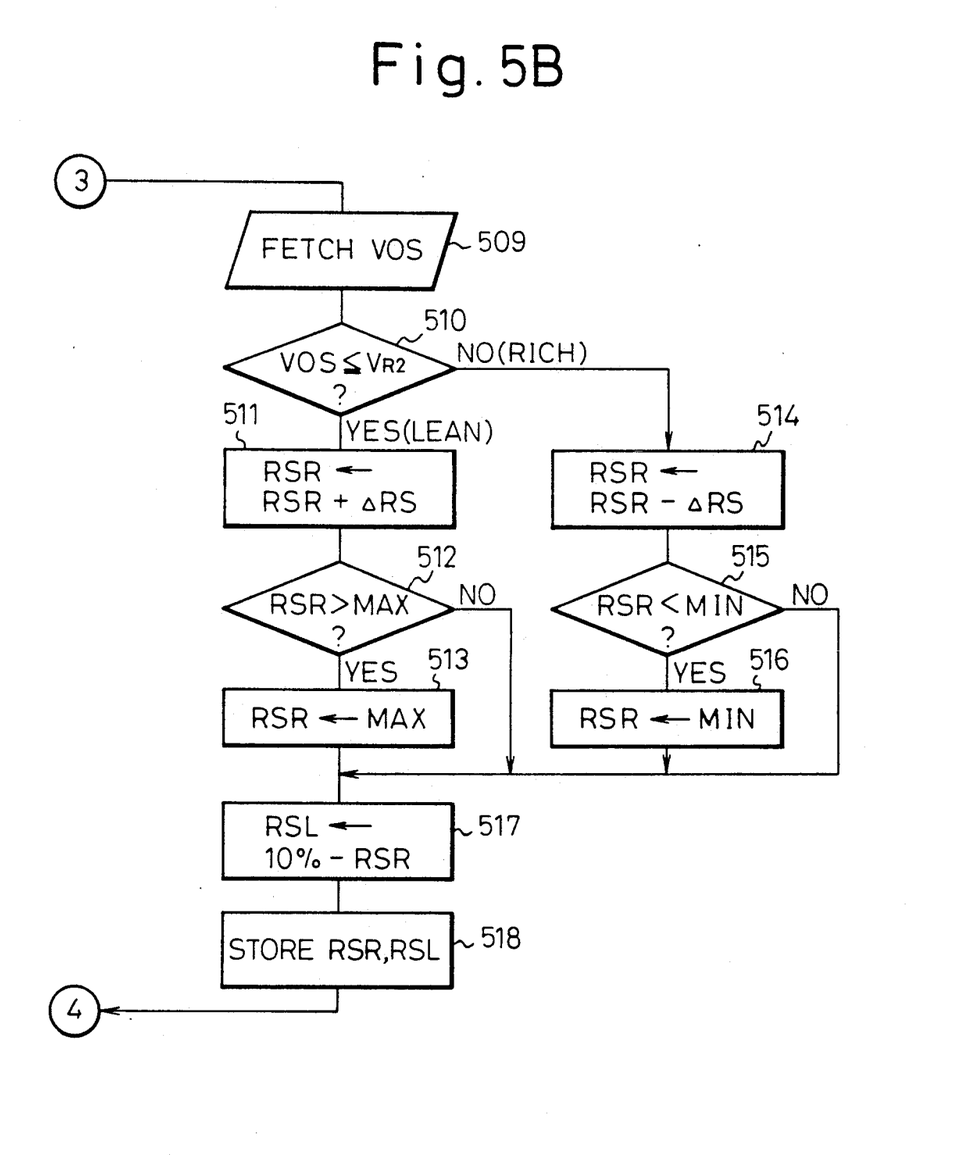

FIGS. 5A and 5B show a flow chart of the control operation of the double $O_2$ sensor systems in which the skip amounts RSR, RSL are varied in accordance with the output VOS of the downstream $O_2$ sensor 15. This routine is executed at predetermined intervals such as 512 ms.

The steps from 501 to 506 of FIG. 5A show the operation for determining whether the conditions for executing the feedback control based on the output of the downstream $O_2$ sensor 15 are satisfied.

These conditions are,
1) the conditions for executing the air-fuel ratio feedback control based on the outputs of the upstream $O_2$ sensor 13 are satisfied (the air-fuel ratio feedback control flag XMFB="1" at step 501),
2) the temperature THW of the coolant is higher than a predetermined value (e.g., 70° C.) (step 502),
3) the throttle valve 16 is not fully closed (i.e., the signal LL is not ON), (step 503),
4) the secondary air AS is not introduced into the exhaust manifold. (step 504),
5) the load of the engine represented by $Q/N_e$ is more than a predetermined value $X_1$ (i.e., $Q/N_e \geq X_1$), (step 505),
6) the downstream $O_2$ sensor 15 is activated (step 506).

If any one of these conditions is not satisfied, the routine proceeds to step 519, in which an air-fuel ratio feedback control operation flag XSFB is reset ("0").

If all of the conditions of steps 501 to 506 are satisfied, the flag XSFB is set ("0") at step 508, and the routine proceeds to step 509 of FIG. 5B.

The steps 509 through 518 illustrate the operation for calculating the skip amounts RSR or RSL in accordance with the output VOS of the downstream $O_2$ sensor 15.

At step 509, A/D conversion is performed on the output voltage VOS of the downstream $O_2$ sensor 15, and the A/D converted value thereof is then fetched from the A/D converter 101. Then, at step 510, the voltage VOS is compared with a reference voltage $V_{R2}$ such as 0.55 V, to thereby determine whether the current air-fuel ratio detected by the downstream $O_2$ sensor 15 is on the rich side or on the lean side with respect to the stoichiometric air-fuel ratio. Note that the reference voltage $V_{R2}$ (0.55 V) is preferably higher than the reference voltage $V_{R1}$ (0.45 V), in consideration of the difference in output characteristics and rate of deterioration of the O$_2$ sensor 13 upstream of the catalytic converters and the O$_2$ sensor 15 downstream of the catalytic converters.

If VOS≦V$_{R2}$ (lean state) at step 510, then the routine proceeds to steps 511 to 513, and if VOS>V$_{R2}$ (rich state), the routine proceeds to steps 514 to 516. Namely, at step 511, the rich skip amount RSR is increased by ΔRS (constant value), to thereby shift the air-fuel ratio to the rich side. Then at steps 512 and 513, the skip amount RSR is guarded by a maximum value MAX (e.g., approximately 7.5%). On the other hand, at step 514, the rich skip amount is decreased by ΔRS, to thereby shift the air-fuel ratio to the lean side. Then, at steps 515 and 516, the rich skip amount RSR is guarded by a minimum value MIN (e.g., approximately 2.5%). The maximum value MAX is selected so that the amount of change of the air-fuel ratio is maintained within a range which does not worsen drivability, and the minimum value MIN is selected so that the response of the control in a transient condition is not worsened.

At step 517, the lean skip amount RSL is calculated by $$RSL \leftarrow 10\% - RSR.$$

Namely, the sum of RSR and RSL is maintained at 10%. Then at step 518, the skip amounts RSR and RSL are stored in the backup RAM 106, and the routine terminates at step 520 in FIG. 5A.

Figure 6:
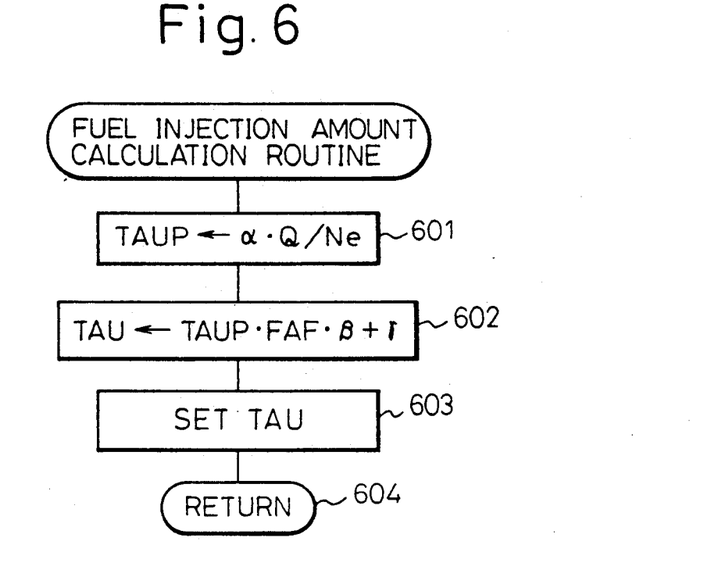

FIG. 6 shows a routine for calculating the fuel injection amount using the air-fuel ratio correction factor FAF calculated by the routine of FIGS. 3A and 3B.

At step 601, a basic fuel injection amount TAUP is calculated in accordance with the amount of the intake air per one revolution of the engine, Q/N$_e$, by $$TAUP \leftarrow \alpha \cdot Q/N_e$$

where, TAUP is the fuel injection amount required to obtain the stoichiometric air-fuel ratio and α is a predetermined constant.

Then, at step 602, a fuel injection amount TAU is calculated by $$TAU \leftarrow TAUP \cdot FAF \cdot \beta + \gamma$$

where, β and γ are correction factors determined by operating conditions of the engine. The calculated TAU is set to the down counter 108 and a flip-flop 109 is set at step 603, whereby fuel injection is started.

As stated before, when the time corresponding to TAU has lapsed, the flip-flop 109 is reset by the signal from the down counter 108, whereby the fuel injection is terminated.

Figure 7A:
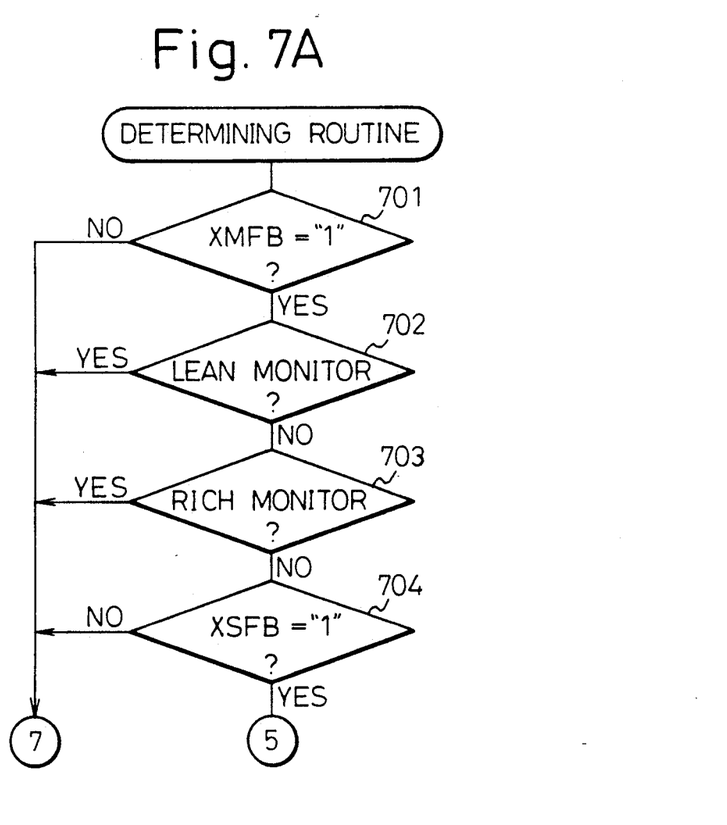
Figure 7B:
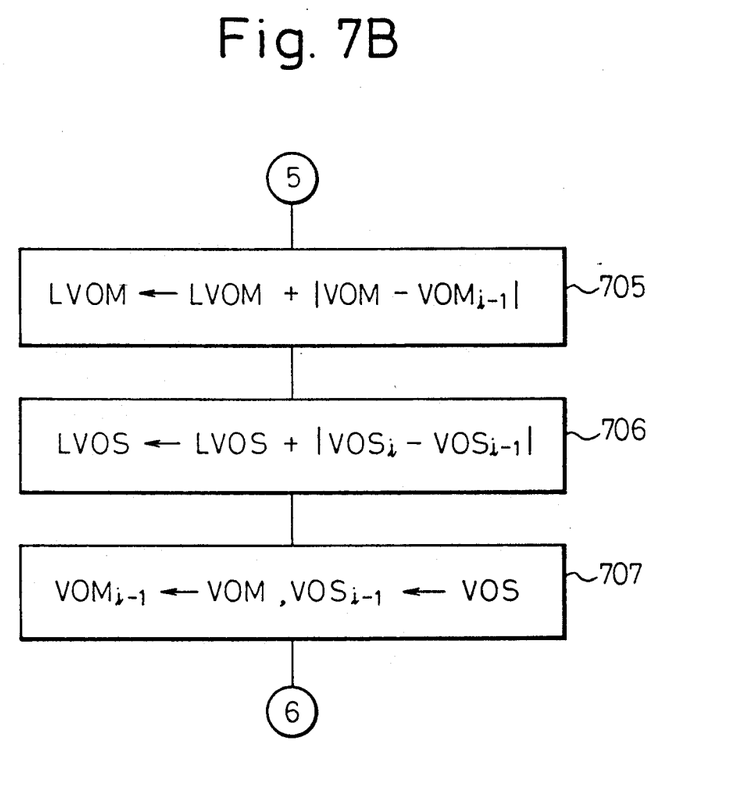
Figure 7C:
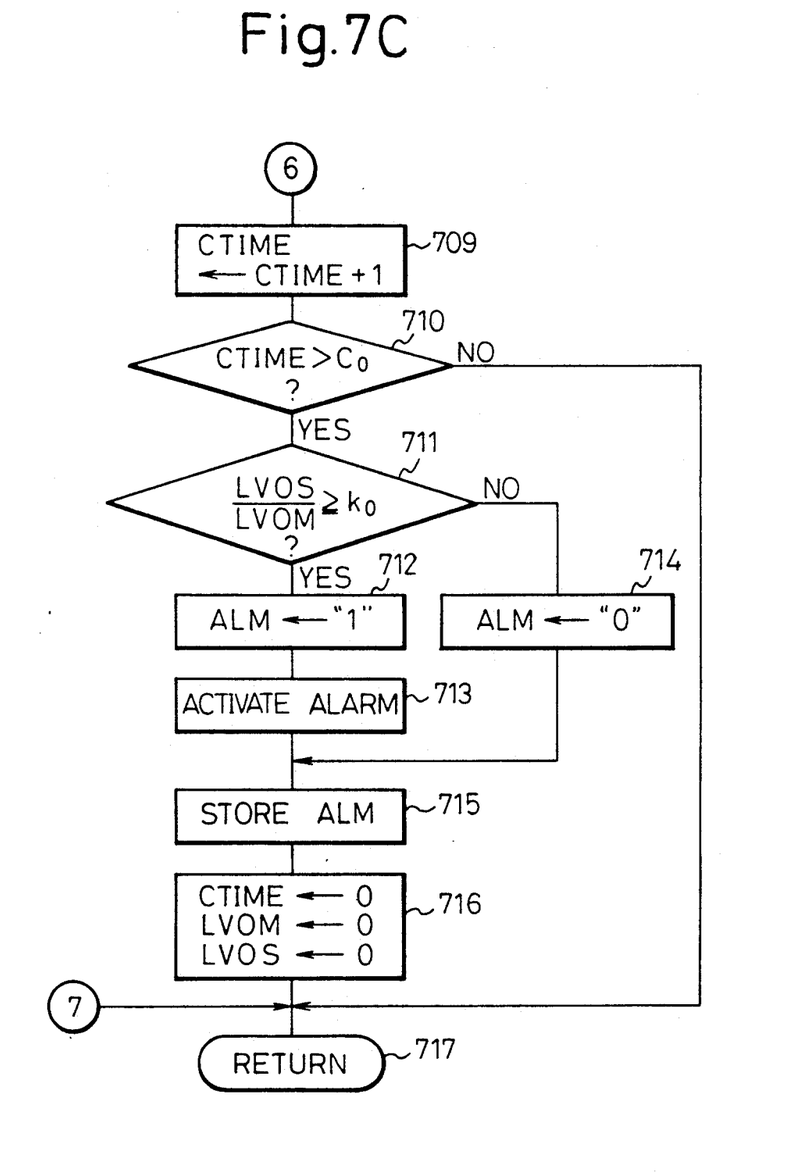

FIGS. 7A to 7C show the routine for determining whether or not the catalytic converter 12 has deteriorated. This routine is executed by the control circuit 10 at predetermined intervals such as 4 ms.

When the routine is started, it is determined at step 701 in FIG. 7A, whether or not the air-fuel ratio feedback control based on the output VOM of the upstream O$_2$ sensor 13 is being carried out, by determining the value of the flag XMFB. If the feedback control is being carried out (i.e., XMFB="1" at step 701), it is determined by a lean monitor at step 702 and a rich monitor at step 703 whether or not a lean side condition or a rich side condition of the output VOM of the upstream O$_2$ sensor is being maintained for more than a predetermined time. At step 704, it is determined whether or not the air-fuel ratio feedback control based on the output VOS of the downstream O$_2$ sensor 15 is being carried out, by determining the value of the flag XSFB.

The determination of the deterioration of the catalyst (steps 705 to 716) is carried out only when the air-fuel ratio feedback control based on both VOM and VOS is carried out (XMFB="1" at step 701 and XSFB="1" at step 704), and the output VOM of the upstream O$_2$ sensor 13 does not stay at the lean side or the rich side for more than a predetermined time (steps 702 and 703).

The reason why the lean monitor (step 702) and the rich monitor (step 703) are required is because if the output VOM stays on the lean side or rich side (i.e., if the response curve of the output VOM does not intersect the reference voltage line), the values of LVOM (the length of the response curve of the output of upstream O$_2$ sensor) 13 is not calculated effectively. Namely, the determination of the deterioration of the catalyst is carried out only when the shape of the response curve of the output VOM is similar to the response curve shown in FIG. 1A.

At step 705 in FIG. 7B, the length LVOM of the output response curve of the upstream O$_2$ sensor are calculated by;

$$LVOM = LVOM + |VOM - VOM_{i-1}|$$

Figure 8:
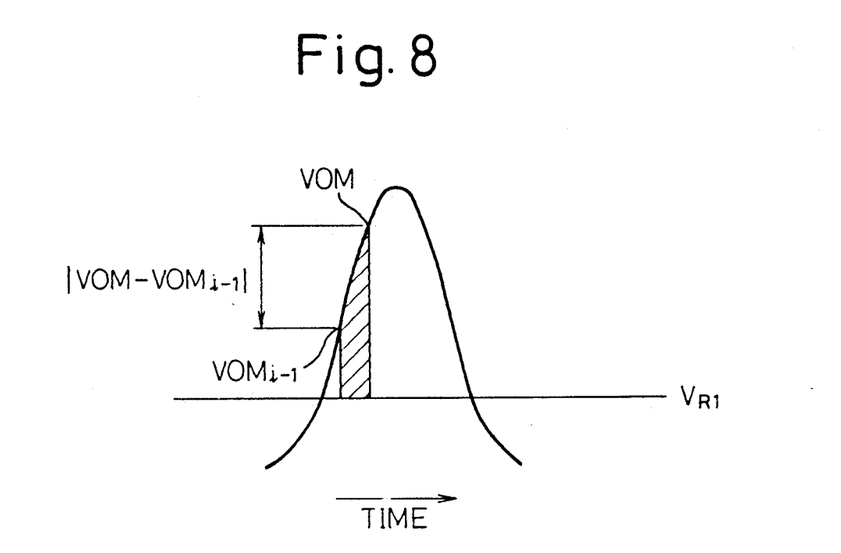
FIG. 8 is a diagram explaining the length LVOM of the output response curve of the upstream $O_2$ sensor.

In the above calculation, VOM$_{i-1}$ is the value of the output VOM when the routine was last executed. In this embodiment, as schematically shown in FIG. 8, the value |VOM−VOM$_{i-1}$| corresponds to the length of a fragment of the response curve of the output VOM corresponding to the interval of the execution of the routine. Note that, the sampling interval between VOM$_{i-1}$ and VOM is shown much longer than the actual interval, compared with the oscillation period of the output in FIG. 8. Also, note that the length LVOM can be calculated more precisely by considering the shape of the response curve.

At step 706, the length LVOS of the output response curve of the downstream O$_2$ sensor is calculated similarly by;

$$LVOS = LVOS + |VOS - VOS_{i-1}|$$

where, the value VOS$_{i-1}$ is the value of output VOS when the routine was last executed.

After calculating LVOM and LVOS at step 707, the values VOM$_{i-1}$ and VOS$_{i-1}$ are renewed to prepare for the next execution of the routine.

Then, at step 709 in FIG. 7C, the counter CTIME is increased by 1 and at step 710, it is determined whether or not the value of the counter CTIME exceeds a predetermined value Co, where, the value Co is the count of the execution of the routine corresponding to 40 reversals of the output VOM of the upstream O$_2$ sensor 13 (i.e., corresponds to approximately 20 seconds in this embodiment).

By setting Co at an appropriate value, the calculated length of the output response curve is not affected by momentary fluctuation of the output, thus the accuracy of the determination is increased.

If CTIME>Co at step 710, the routine proceeds to step 711 at which the deterioration of the catalyst is determined based on the ratio of the lengths of the output response curves of the upstream and downstream O₂ sensors (LVOS/LVOM).

At step 711, it is determined whether the ratio LVOS/LVOM is larger than or equal to a predetermined value Ko, where the value Ko is determined in accordance with the type of the catalyst etc. If the ratio LVOS/LVOM≧Ko at step 711, the catalyst is determined to be deteriorated (see FIG. 1 (C), (D), (E)) and the routine proceeds to step 712, where an alarm flag ALM is made "1". Then, the alarm 19 in FIG. 2 is activated at step 713 to warn the driver that the catalyst has deteriorated. If the ratio LVOS/LVOM is smaller than Ko at step 711, the catalyst is determined to be normal (see FIG. 1 (B), (F), (G)), and the alarm flag ALM is reset (="0") at step 714.

In both cases, the value of the alarm flag ALM is stored in the backup RAM 106 of the control circuit 10 to prepare for future maintenance and inspection (step 715).

After executing the above steps, the parameters LVOM, LVOS, and CTIME are cleared at step 716 to prepare for the next determining operation, and the routine is then terminated at step 717.

In the above embodiment, the determination of the deterioration of the catalyst is carried out on the basis of the ratio LVOS/LVOM. In this case, the length LVOM is introduced to exclude the influence of change of the output VOS caused by a certain operating condition of the engine. Since the output VOM is also affected by such operating conditions, possible error caused by the operating condition can be avoided by using the ratio LVOS/LVOM (step 711).

Figure 9:
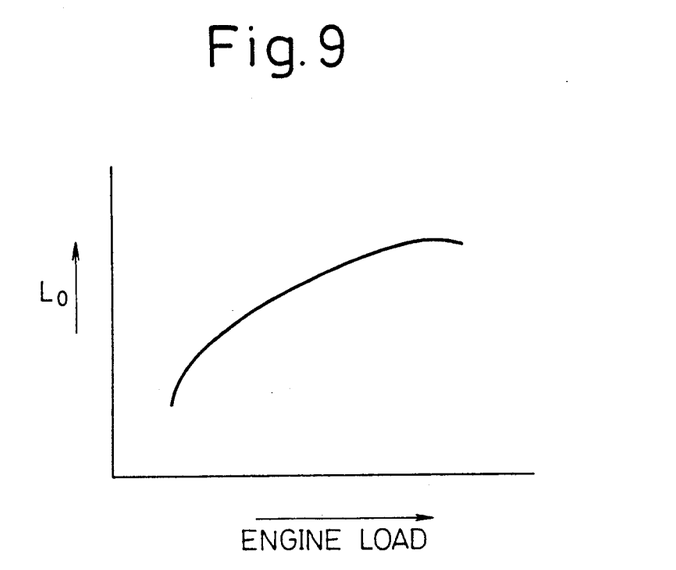
FIG. 9 shows an example of the relationship between the value of the variable used for the determination of the deterioration of the catalyst and the engine load.

However, it is also possible to determine the deterioration of the catalyst in accordance with the value LVOS itself. In this case, the catalyst is determined to be deteriorated when the length LVOS is larger than or equal to a predetermined value. Further, instead of using the ration LVOS/LVOM, it is also possible to determine the deterioration of the catalyst based on a ratio LVOS/Lo at step 711, where Lo is a variable determined by the operating load of the engine as shown generally in FIG. 9.

In the double O₂ sensor system explained above, the feedback control based on the upstream O₂ sensor is carried out every 4 ms, while the feedback control based on the downstream O₂ sensor is carried every 512 ms. This is to control the air-fuel ratio of the engine mainly by the upstream O₂ sensor so that a good response of the control is assured, and to use the downstream O₂ sensor which has a relatively lower response for only compensating for individual differences or changes of the characteristics of the upstream O₂ sensor.

The present invention also can be applied to other types of double O₂ sensor systems in which other control parameters of the feedback control based on the upstream O₂ sensor, such as delay times TDR and TDL and the integration amounts KIR and KIL, are variable or in which the second air-fuel ratio correction factor FAF2 is introduced.

Also, in the present invention it is possible to fix the value of one of the skip amounts RSR and RSL (or the delay times TDR and TDL or the integration amounts KIR and KIL) and to vary the other.

Further, though the air-fuel ratio feedback control in the above embodiment is carried out based on the outputs of both the upstream and downstream O₂ sensors, the present invention can also be applied to a double O₂ sensor system in which the air-fuel ratio feedback control is carried out based on the output of the upstream O₂ sensor alone. In this case, the downstream O₂ sensor is used only to determine the deterioration of the catalyst.

Also, in the above embodiment, the amount of the fuel injected to the engine is calculated in accordance with the amount of the intake air and the engine speed. However, the present invention can be applied to a system in which the amount of the fuel injection is calculated in accordance with the inlet manifold pressure and the engine speed, or the degree of opening of the throttle valve and the engine speed, etc. Further, instead of the potentiometer-type air flow meter of the above embodiment, a Karman vortex type or heat wire type air flow meter can be used equally well.

Further, the present invention can be applied to a fuel system other than the fuel injection system. For example, a carburetor type fuel system in which the air-fuel ratio is adjusted by controlling the amount of the inlet air by an electric air control valve (EACV), or by controlling the amount of the bleed air of the carburetor to adjust the amount of the atmospheric air introduced into the main system and the slow speed system of the carburetor. In these cases, the basic fuel amount corresponding to TAUP of the step 601 in FIG. 6 is determined by the carburetor itself in accordance with the inlet manifold pressure and the engine speed, and the amount of the inlet air supplied to the engine is calculated in accordance with the fuel injection amount TAU of the step 602 in FIG. 6.

Also, in the above embodiment, O₂ sensors are used for air-fuel ratio sensors, but other types of sensors, such as lean mixture sensors or CO sensors, also can be used as the air-fuel ratio sensors in the present invention. If a T$_i$O₂ sensor is used for the upstream air-fuel ratio sensor, the control response of the system is largely improved, whereby over compensation by the downstream air-fuel ratio sensor can be effectively prevented.

Further, in the above embodiment, a microcomputer, i.e., a digital circuit, is used for the control circuit, but an analog circuit can be used equally well for the control circuit of the present invention.

We claim:

1. A device for determining a deterioration of a three-way catalyst disposed in an exhaust passage of an internal combustion engine, said engine comprising an upstream air-fuel ratio sensor disposed in the exhaust passage upstream of said three-way catalyst for generating an output signal corresponding to an air-fuel ratio of the exhaust gas upstream of said three-way catalyst, a downstream air-fuel ratio sensor disposed in the exhaust passage downstream of said three-way catalyst for generating an output signal corresponding to an air-fuel ratio of the exhaust gas downstream of said three-way catalyst, and a feedback control means for controlling the air-fuel ratio of the engine by feedback control, said device comprising:

a means for calculating the length of the response curve of the output signal of said downstream air-fuel ratio sensor when the air-fuel ratio of the engine is controlled by said feedback control means, and a determining means for determining whether or not said three-way catalyst has deteriorated in accordance with, at least, said calculated length of the response curve of the output signal of said downstream air-fuel ratio sensor.

2. A device according to claim 1, wherein said determining means determines that said catalyst has deteriorated when said length of the response curve of the output signal of said downstream air-fuel ratio sensor is larger than a predetermined value.

3. A device according to claim 1, further comprising a parameter means for detecting a parameter associated with the condition of the change of the air-fuel ratio of the exhaust gas upstream of said catalyst, and said determining means determines whether or not said catalyst has deteriorated in accordance with said parameter and said length of the output signal response curve of said downstream air-fuel ratio sensor.

4. A device according to claim 3, wherein said parameter associated with the condition of the change of the air-fuel ratio of the exhaust gas upstream of said catalyst is the length of the output signal response curve of said upstream air-fuel ratio sensor when the engine air-fuel ratio is controlled by said feedback control means, and said determining means determines that said catalyst has deteriorated when the ratio of said length of the output signal response curve of the downstream air-fuel ratio sensor and said length of the output signal response curve of the upstream air-fuel ratio sensor becomes larger than a predetermined value.

5. A device according to claim 3, wherein said parameter associated with the change of the air-fuel ratio of the exhaust gas upstream of said catalyst is a variable determined by the operating load of the engine, and said determining means determines that said catalyst has deteriorated when the ratio of said length of the output signal response curve of said downstream air-fuel ratio sensor and said variable determined by the operating load of the engine becomes larger than a predetermined value.

6. A method for determining a deterioration of a three-way catalyst disposed in an exhaust passage of an internal combustion engine having an upstream air-fuel ratio sensor disposed in the exhaust passage upstream of said three-way catalyst for generating an output signal corresponding to an air-fuel ratio of the exhaust gas upstream of said three-way catalyst, a downstream air-fuel ratio sensor disposed in the exhaust passage downstream of said three-way catalyst for generating an output signal corresponding to an air-fuel ratio of the exhaust gas downstream of said three-way catalyst, and a feedback control means for controlling the air-fuel ratio of the engine by feedback control, said method comprising the steps of:

calculating the length of the response curve of the output signal of said downstream air-fuel ratio sensor when the engine is controlled by said feedback control means, and determining whether or not said three-way catalyst has deteriorated in accordance with at least said calculated length of the response curve of the output signal of said downstream air-fuel ratio sensor.

7. A method according to claim 6, wherein said determining step comprises a step of determining that said catalyst has deteriorated when said length of the response curve of the output signal of said downstream air-fuel ratio sensor is larger than a predetermined value.

8. A method according to claim 6, further comprising a step of detecting a parameter associated with the condition of change of the air-fuel ratio of the exhaust gas upstream of said catalyst, and wherein said determining step determines whether or not said catalyst has deteriorated in accordance with said parameter and said length of the output signal response curve of said downstream air-fuel ratio sensor.

9. A method according to claim 8, wherein said parameter associated with the change of the air-fuel ratio of the exhaust gas upstream of said catalyst is the length of the output signal response curve of said upstream air-fuel ratio sensor when the engine air-fuel ratio is controlled by said feedback control means, and said determining step comprises a step of determining that said catalyst has deteriorated when the ratio of said length of the output signal response curve of the downstream air-fuel ratio sensor and said length of the output signal response curve of the upstream air-fuel ratio sensor becomes larger than a predetermined value.

10. A method according to claim 3, wherein said parameter associated with the change of the air-fuel ratio of the exhaust gas upstream of said catalyst is a variable determined by the operating load of the engine, and said determining step comprises a step of determining that said catalyst has deteriorated when the ratio of said length of the output signal response curve of said downstream air-fuel ratio sensor and said variable determined by the operating load of the engine becomes larger than a predetermined value.

* * * * *